United States Patent
Nagahama et al.

(10) Patent No.: US 8,972,842 B2
(45) Date of Patent: Mar. 3, 2015

(54) METHOD OF PROCESSING DATA FOR AN INFORMATION PROCESSING APPARATUS

(75) Inventors: Kentaro Nagahama, Tachikawa (JP); Sumi Omura, Mitaka (JP); Kensuke Horiuchi, Kunitachi (JP); Takayuki Iida, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 541 days.

(21) Appl. No.: 13/411,279

(22) Filed: Mar. 2, 2012

(65) Prior Publication Data

US 2012/0297286 A1 Nov. 22, 2012

(30) Foreign Application Priority Data

May 18, 2011 (JP) ................................. 2011-111467

(51) Int. Cl.
  G06F 17/00 (2006.01)
  G06F 17/30 (2006.01)
(52) U.S. Cl.
  CPC ...... G06F 17/30864 (2013.01); G06F 17/3064 (2013.01)
  USPC ........... 715/205; 715/207; 715/234; 715/808; 715/810
(58) Field of Classification Search
  None
  See application file for complete search history.

(56) References Cited

U.S. PATENT DOCUMENTS

| 7,496,581 | B2 | 2/2009 | Nomiyama et al. | |
| 8,219,577 | B2 | 7/2012 | Nakano et al. | |
| 2001/0047373 | A1* | 11/2001 | Jones et al. | 707/515 |
| 2005/0021677 | A1 | 1/2005 | Musha et al. | |
| 2005/0138027 | A1* | 6/2005 | Kawakita | 707/5 |
| 2007/0067317 | A1 | 3/2007 | Stevenson | |
| 2007/0192310 | A1* | 8/2007 | Takagi et al. | 707/5 |
| 2009/0234811 | A1* | 9/2009 | Jamil et al. | 707/3 |
| 2010/0076991 | A1 | 3/2010 | Nakano et al. | |
| 2010/0082673 | A1* | 4/2010 | Nakano et al. | 707/776 |
| 2012/0226971 | A1* | 9/2012 | Tocchini et al. | 715/234 |

FOREIGN PATENT DOCUMENTS

| JP | 2000-172710 A | 6/2000 |
| JP | 2002-149668 A | 5/2002 |
| JP | 2004-054631 A | 2/2004 |
| JP | 2004-348241 A | 12/2004 |
| JP | 2007-527558 A | 9/2007 |
| JP | 2009-169924 A | 7/2009 |
| JP | 2010-066870 A | 3/2010 |
| WO | WO 2004/095314 A2 | 11/2004 |

OTHER PUBLICATIONS

Japanese Office Action for Patent Application No. 2012-193231, dated Apr. 22, 2014, 8 pages including translation.
Japanese Office Action dated May 8, 2012 of corresponding Japanese Patent Application No. 2011-111467.
Toshiro Takahashi, "Controlling a Pop-up Window (Safely)," Web Designing 01, Japan, Kabushiki Kaisha Mainichi Communications, Jun. 10, 2001, vol. 9, No. 12, pp. 86 to 89.

* cited by examiner

*Primary Examiner* — Stephen Hong
*Assistant Examiner* — Keith Bloomquist
(74) *Attorney, Agent, or Firm* — Knobbe Martens Olson & Bear LLP

(57) ABSTRACT

According to one embodiment, a method of processing data for an information processing apparatus includes extracting, displaying, transmitting and updating. The extracting extracts keywords from a Web page being displayed by a browser. The displaying displays the extracted keywords. The transmitting transmits a keyword and attribute data associate with the keyword to a retrieval site, if the keyword is selected from the displayed keywords. The updating updates the displayed keywords if the browser acquires the Web page.

20 Claims, 13 Drawing Sheets

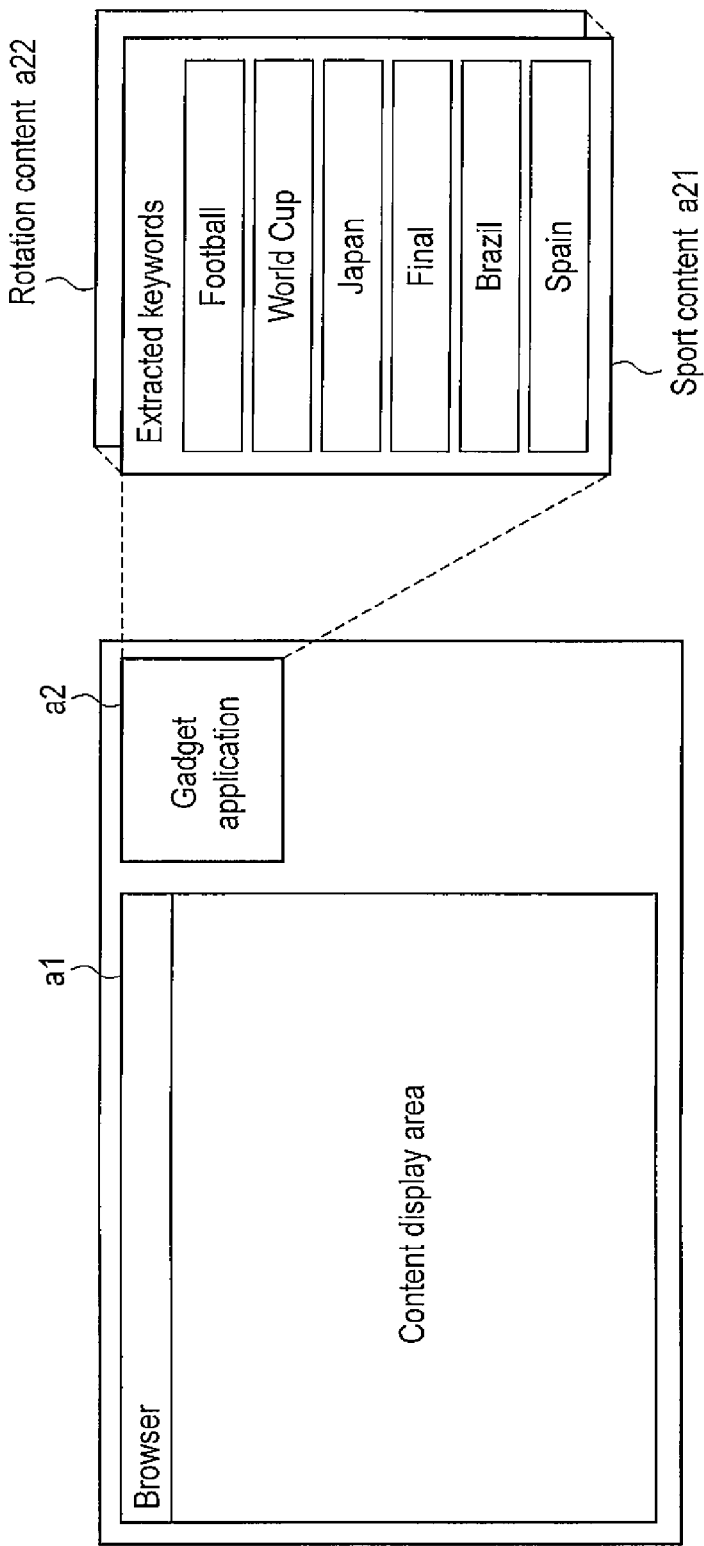
F I G. 3

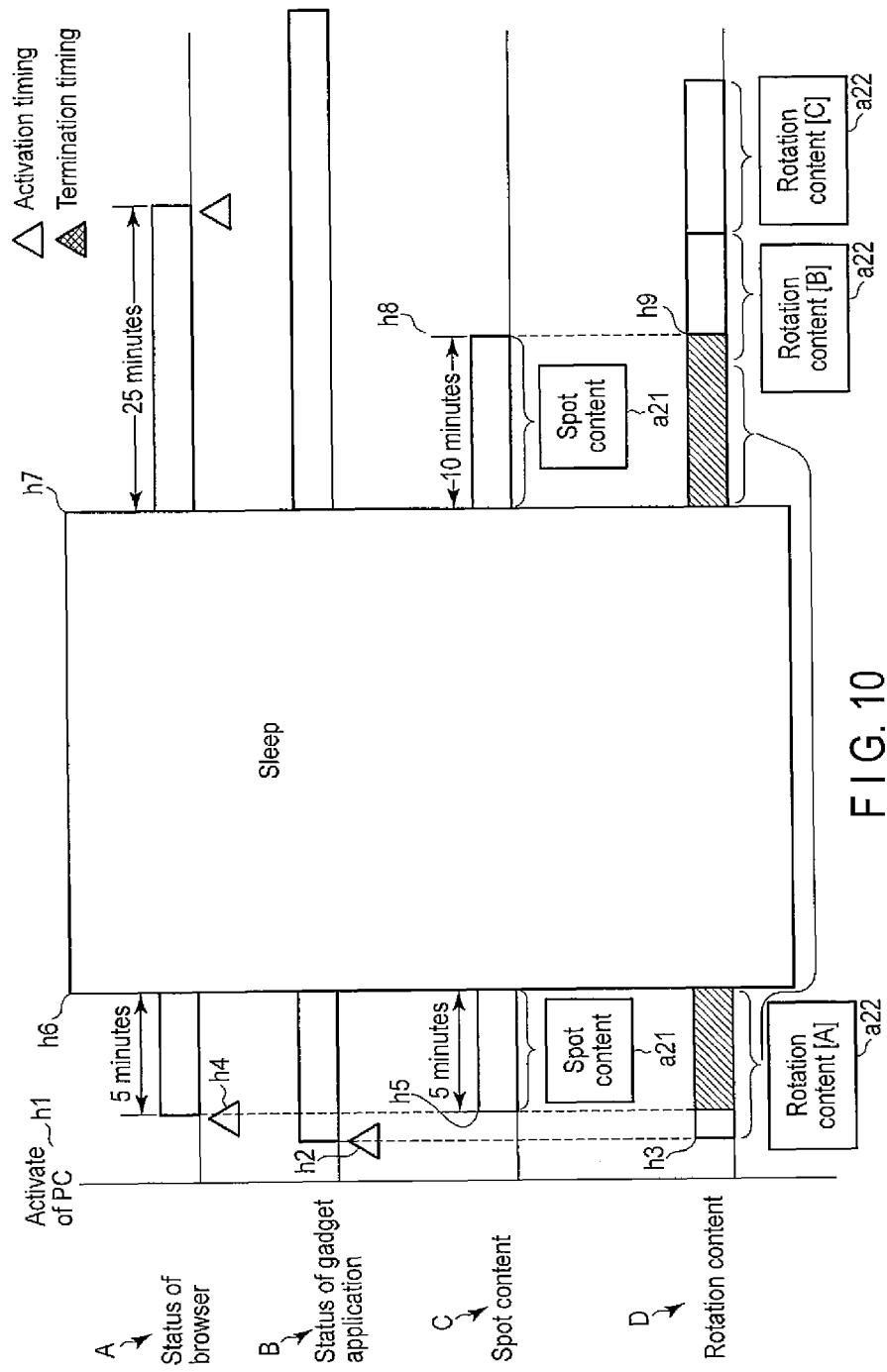
F I G. 10

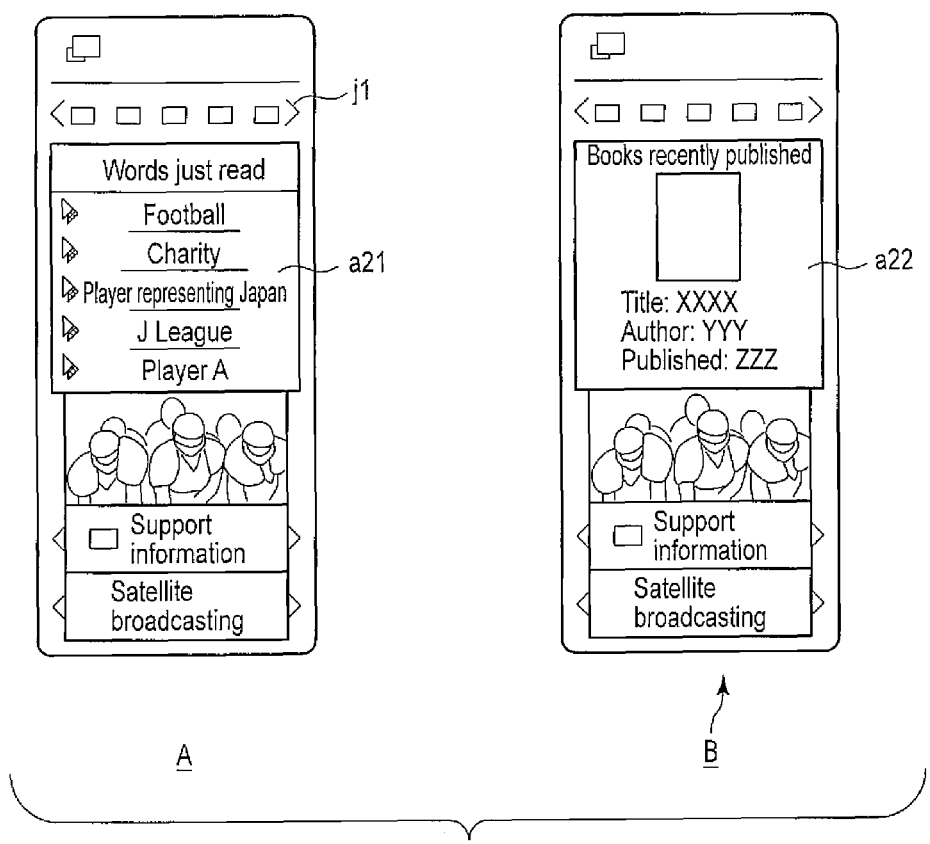
F I G. 12

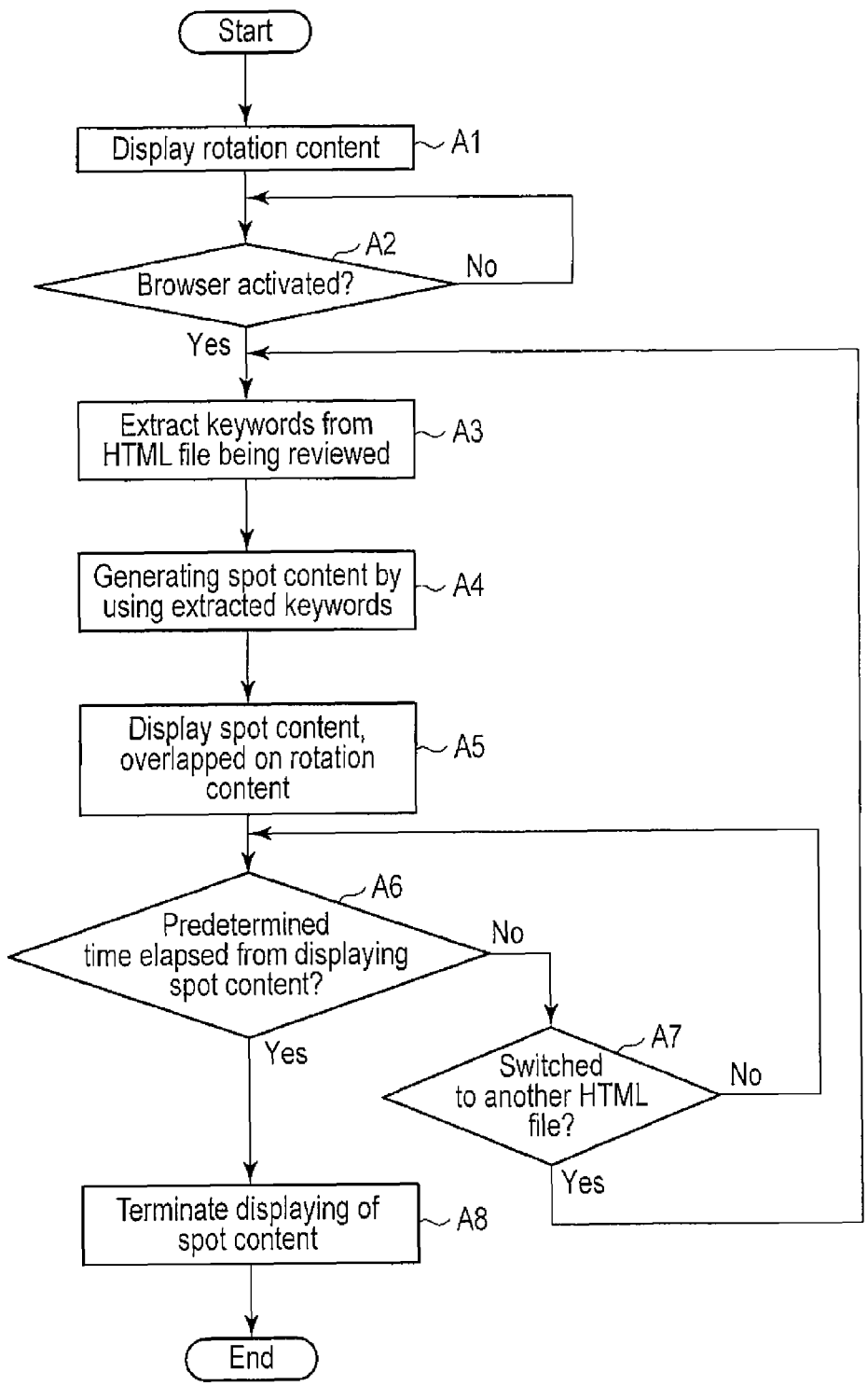
F I G. 13

METHOD OF PROCESSING DATA FOR AN INFORMATION PROCESSING APPARATUS

CROSS-REFERENCE TO RELATED APPLICATIONS

This application is based upon and claims the benefit of priority from prior Japanese Patent Application No. 2011-111467, filed May 18, 2011, the entire contents of which are incorporated herein by reference.

FIELD

Embodiments described herein relate generally to a data processing technique suitable for an information processing apparatus that includes the function of using, for example, the browser to review Web pages.

BACKGROUND

In recent years, various Web sites have come into existence on the Internet. A great number of Web pages are now published on these Web sites. Any end user (hereinafter referred to as a "user") usually uses a browser, having the home page of any retrieval site (including a portal site providing a retrieval service) displayed on his or her personal computer (PC), and inputs keywords on the home page, retrieving the Web page or pages he or she wants.

Various methods of enhancing user work efficiency have hitherto been proposed, which are devised to display the relatedness any input keyword has with the Web page retrieved. Assume that Web page [1] and Web page [2] contain one keyword A and two keywords A, respectively. This does not necessarily mean that Web page [2] is more important than page [1] in connection with the keyword A. If the relatedness that any input keyword has with the Web page retrieved is presented to the user, the user's work efficiency can be enhanced.

In the method, wherein the user inputs keywords to retrieve Web pages, the keyword is either a word or a phrase that the user knows or a word or phrase contained in the Web page retrieved that is of interest to the user. That is, in many cases, the keyword used to retrieve Web pages is selected from a relatively small number of candidates. Consequently, the user has but only a few chances of obtaining the unexpected information. Hence, Web pages cannot always be retrieved effectively or with high efficiency.

In view of this, a system should be provided, which can present recommended keywords to each user, enabling the user reviewing a Web page to retrieve other Web pages more efficiently and effectively.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary diagram showing a menu that the information processing apparatus according to the embodiment displays while the user is reviewing a Web page.

FIG. 10 is an exemplary sixth diagram (pattern 6) showing the sequence of displaying spot content in accordance with the operation of a browser in the information processing apparatus according to the embodiment.

FIG. 12 is an exemplary diagram showing a menu the gadget application may display while operating in the information processing apparatus according to the embodiment.

FIG. 13 is an exemplary flowchart showing the sequence of displaying spot content in the information processing apparatus according to the embodiment.

DETAILED DESCRIPTION

Various embodiments will be described hereinafter with reference to the accompanying drawings.

In general, according to one embodiment, a method of processing data for an information processing apparatus includes extracting, displaying, transmitting and updating. The extracting extracts keywords from a Web page being displayed by a browser. The displaying displays the extracted keywords. The transmitting transmits a keyword and attribute data associate with the keyword to a retrieval site, if the keyword is selected from the displayed keywords. The updating updates the displayed keywords if the browser acquires the Web page.

Figure 1:
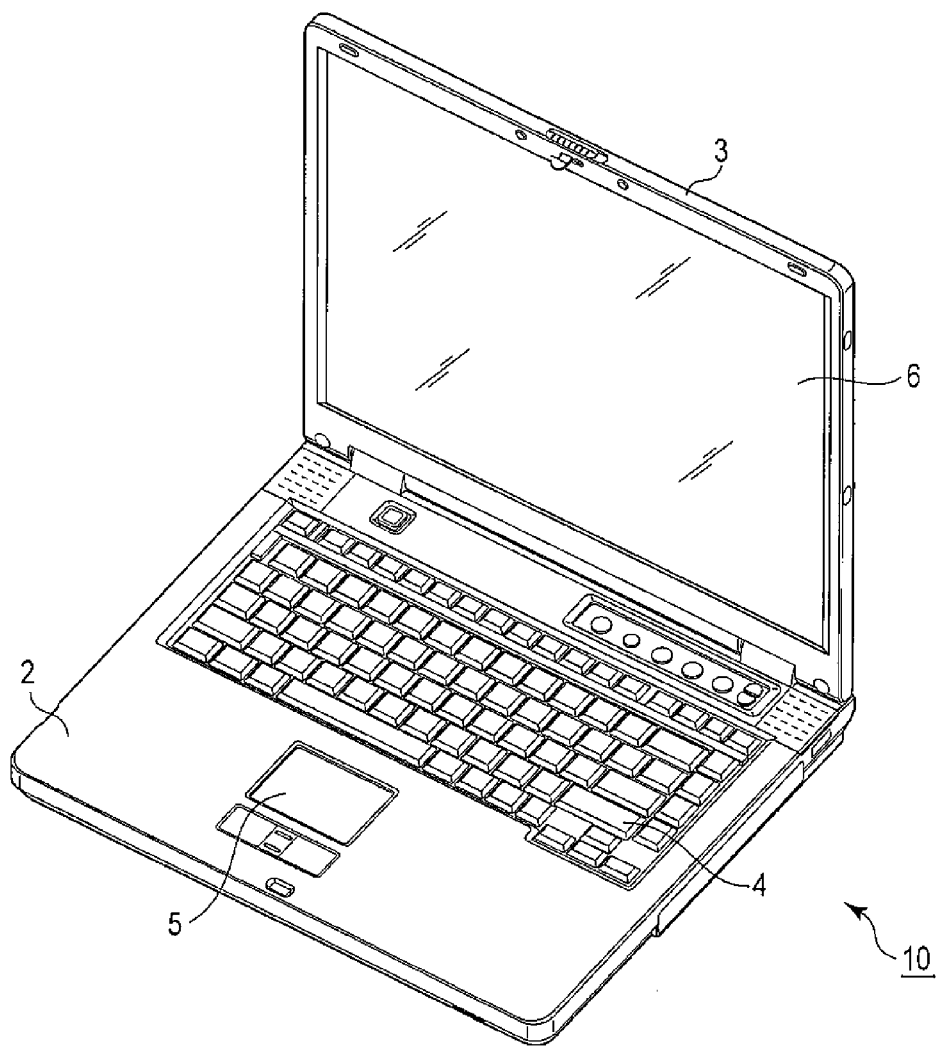
FIG. 1 is an exemplary diagram showing an outer appearance of an information processing apparatus according to an embodiment.

FIG. 1 is an exemplary diagram showing an outer appearance of an information processing apparatus according to the embodiment. The information processing apparatus is implemented as, for example, a battery-powered notebook personal computer 10.

FIG. 1 is an exemplary perspective view showing the computer 10 having its display unit 3 held in an opened position. The computer 10 includes a computer main unit 2 and a display unit 3. The display unit 3 incorporates a liquid crystal display (LCD) 6. The LCD 6 includes a display screen, which is located almost at the center of the display unit 3.

The display unit 3 is secured to the computer main unit 2 and can be freely rotated between an opened position where it exposes the top of the computer main unit 2 and a closed position where it covers the computer main unit 2. The computer main unit 2 is the base unit having a housing shaped like a thin box. On its top, a keyboard 4, and a pointing device 5, etc. are arranged.

The computer main unit 2 incorporates a local area network (LAN) controller and a wireless LAN controller. The LAN controller is configured to perform wired communication that accords with, for example, the IEEE802.3 Standards. The wireless LAN controller is configured to perform wireless communication that accords with, for example, IEEE802.11n Standards. That is, the computer 10 includes the function of accessing any Web site on the Internet, no matter whether it is used indoors or outdoors.

The keyboard 4 and the pointing device 5, both shown in FIG. 1, are the input devices at the user interface the computer 10 provides. By contrast, the LCD 6 is the output device at the user interface the computer 10 provides. More specifically, in the computer 10, various programs are loaded from, for example, the hard disk drive (HDD) to the main memory, the central processing unit (CPU) executes these programs in accordance with the instructions the user has input by operating the keyboard 4 or pointing device, and the results of processes performed as the CPU executes the programs are displayed to the user via the LCD 6. Among the programs are the operating system (OS) and the Basic Input/Output System (BIOS), application programs and a utility program. The OS achieves the resource management in the computer 10. The BIOS is used to control the hardware. The application programs include a browser that enables the user to review Web pages.

Figure 2:
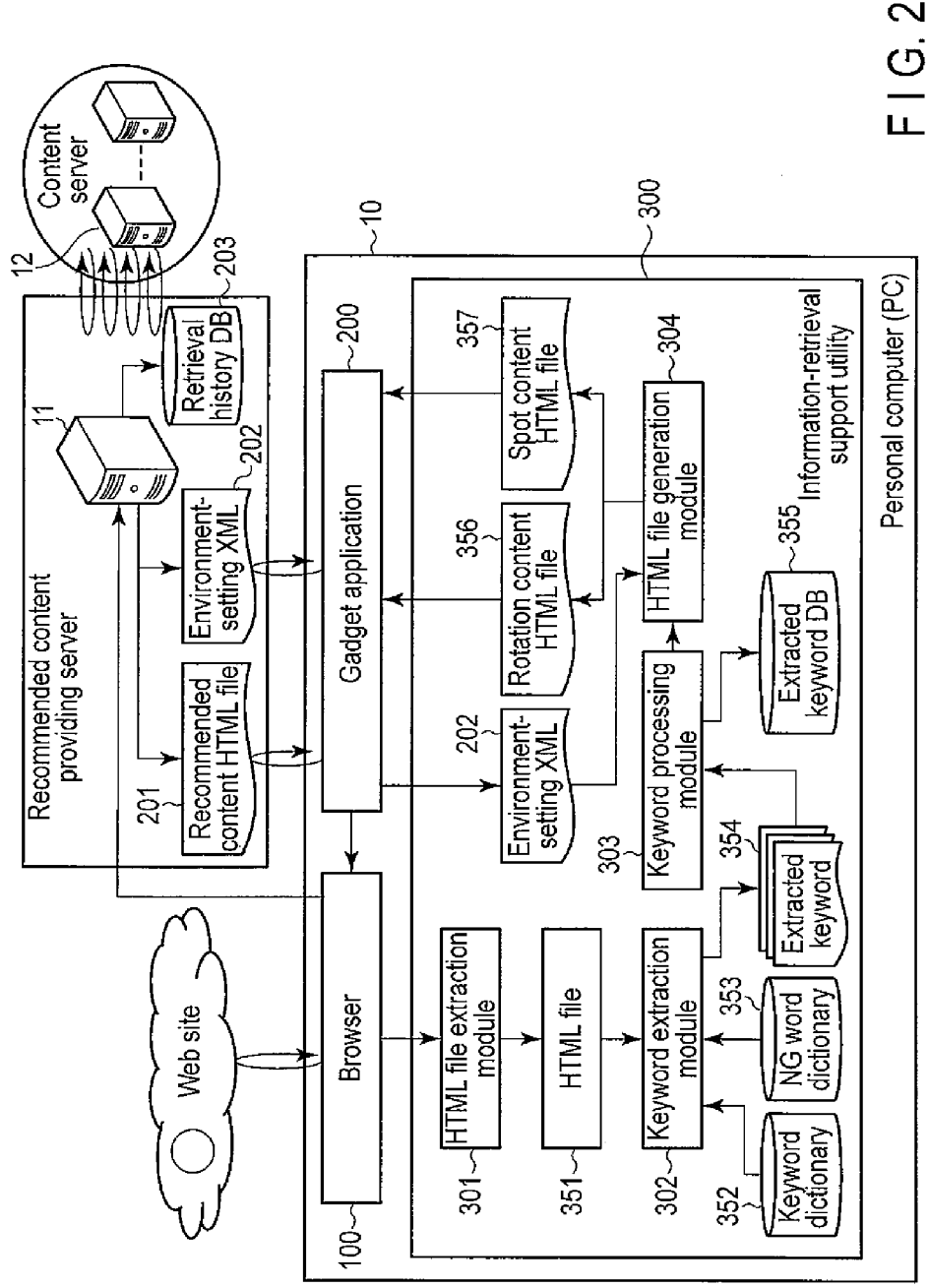
FIG. 2 is an exemplary block diagram showing a software configuration of the information processing apparatus according to the embodiment, which pertains to a review of Web pages.

FIG. 2 is an exemplary block diagram showing a software configuration of the computer 10, which pertains to the review of Web pages.

As FIG. 2 shows, the computer 10 includes browser 100, gadget application 200, and information-retrieval support utility 300, as software (programs) related to the Web page reviewing.

The browser 100 is a program that enables the user to review the Web pages any Web site publishes on the Internet. The browser 100 acquires Web pages from a Web site available on the Internet, in accordance with a uniform resource locator (URL) input at, for example, the keyboard 4. The Web pages are written in the Hypertext Markup Language (HTML), and are provided as HTML files. The browser 100 interprets any HTML file, reproducing the layout of the Web page. The Web page is displayed on, for example, the screen of the LCD 6. The URL can be embedded in the Web page. The user can therefore input the URL by operating the keyboard 4, and can select the URL embedded in the Web page being displayed, by operating, for example, the pointing device 5. In either case, the URL can be given to the browser 100. The user can therefore continuously review Web pages, from one to another, as if tracking links.

Assume that one of the Web sites available on the Internet is a recommended content providing server 11. The recommended content providing server 11 functions also as a portal site providing a retrieval service. In other words, the server 11 functions as a retrieval site. The recommended content providing server 11 receives, from the browser 100, a keyword and attribute data about the keyword, retrieves the Web pages a content server 12 publishes, and sends the results of the retrieval back to the browser 100. The attribute data about the keyword is category (classification) data representing whether the keyword is, for example, a place name or a person name. The content server 12 is one of the Web sites on the Internet.

The gadget application 200 is a program for presenting various data to the user of the computer 10. The information-retrieval support utility 300 is a program that causes the gadget application 200 to present data to the user. In the computer 10 according to this embodiment, the gadget application 200 and the information-retrieval support utility 300 cooperate, efficiently presenting a recommended keyword to the user reviewing the Web page. How the gadget application 200 and the information-retrieval support utility 300 cooperate will be explained below in detail.

As shown in FIG. 2, the information-retrieval support utility 300 includes an HTML file extraction module 301, a keyword extraction module 302, a keyword processing module 303, and an HTML file generation module 304.

The HTML file extraction module 301 is a module configured to extract the Web page, or HTML file the browser 100 is displaying. The HTML file 351 shown in FIG. 2 is an HTML file extracted by the HTML file extraction module 301.

The keyword extraction module 302 is a module configured to perform various processes, such as structure analysis, morpheme analysis and scoring, on the HTML file 351, thereby to extract a keyword from the HTML file 351. The information-retrieval support utility 300 further includes a keyword dictionary 352, an NG word dictionary 353, which the keyword extraction module 302 uses to extract a keyword. The keyword dictionary 352 is used to extract keywords from the text. The NG word dictionary 353 holds the words extracted from the text that should not be used as keywords. Moreover, the information-retrieval support utility 300 includes an extracted keyword dictionary 354, which is a list of the key words the keyword extraction module 302 has extracted from the HTML file 351 and arranged in the order of priority.

The keyword processing module 303 is a module configured to use the keywords 354 extracted by the keyword extraction module 302, generating a keyword list that will be presented to the user. The keyword processing module 303 includes the function of storing keywords 354 extracted, in an extracted keyword database (DB) 355. Therefore, the keyword processing module 303 can not only generate the latest keyword list applicable to the Web page the browser 100 is displaying, but also collect the keywords extracted from the Web pages reviewed in a predetermined past period (e.g., one day, one week, or the like) and generate a keyword list for the predetermined past period.

The HTML file generation module 304 is a module configured to generate HTML files that the gadget application 200 uses to display various data including the keyword list generated by the keyword processing module 303. More precisely, the HTML file generation module 304 generates two HTML files, i.e., a rotation content HTML file 356 and spot content HTML file 357. The spot content HTML file 357 may be an HTML file that the gadget application 200 uses to display the keyword list the keyword processing module 303 has generated.

The rotation content HTML file 356 is an HTML file that the gadget application 200 uses to display a screen introducing, for example, movies, books recently published, software items recently developed and service items, all recommended to the user. The HTML file generation module 304 acquires a recommended content HTML file 201 from the recommended content providing server 11 through the HTML file the gadget application 200, and generates a rotation content HTML file 356 from the data contained in the recommended content HTML file 201. The rotation content HTML file 356 is so configured that the information to present to the user may be periodically switched.

The recommended content providing server 11 receives many retrieval keywords from the browser 100 and stores these retrieval keywords in a retrieval history data base (DB) 203. In the recommended content providing server 11, the recommended content HTML file 201 stores the keywords collected in the predetermined past period. The HTML file generation module 304 generates a rotation content HTML file 356 so that the result of keyword collection may be displayed to the user as a recommended keyword list.

Thus, the information-retrieval support utility 300 can present to the user three keyword lists, i.e., (1) the latest keyword list extracted from the Web page the browser 100 is displaying, and (2) the keyword list extracted from the Web pages the user has periodically reviewed by virtue of the spot content HTML file 357, and (3) the keyword list that many unidentified users have used for a specific period by virtue of the rotation content HTML file 356. The keyword list (3), which the many unidentified users have used for the specific period, can be presented to the user, also by virtue of the spot content HTML file 357.

The HTML file generation module 304 acquires environment-setting extended markup language (XML) 202 from the recommended content providing server 11 through the gadget application 200. On the basis of the data contained in the environment-setting XML 202, the HTML file generation module 304 sets an environment, setting the timing at which the gadget application 200 displays the rotation content HTML file 356 and the spot content HTML file 357.

Assume that the user operates the pointing device 5, selecting one of the keywords shown in the keyword list, while the spot content HTML file 357 is being displayed. Then, the gadget application 200 supplies the keyword thus selected and the attribute data of the keyword to the browser 100, together with the address data of the recommended content providing server 11, which designates the address to which the keyword and attribute data thereof should be transferred. On receiving the keyword and the attribute data thereof, the browser 100 transfers them to the recommended content providing server 11. The browser 100 then receives and displays the result of retrieval from the recommended content providing server 11.

FIG. 3 is an exemplary diagram showing a menu that the information processing apparatus according to the embodiment displays while the user is reviewing a Web page displayed by the display unit 3 of the computer 10.

In FIG. 3, "a1" is the window that the browser 100 provides, and "a2" is the window that the gadget application 200 provides. In the window a1, the Web page published at a Web site on the Internet is displayed. In the window a2, spot content a21 or a rotation content a22 is displayed. The spot content a21 is a screen displayed on the basis of the spot content HTML file 357. The rotation content a22 is a screen displayed on the basis of the rotation content HTML file 356.

If the user reviews any Web page by using the browser 100, the gadget application 200 displays the keywords extracted from the Web page the browser 100 is displaying, in the form of a recommended keyword list as shown in FIG. 3. This can help the user to retrieve Web pages more efficiently than otherwise, with an objective point of view.

If the Web page the browser 100 is displaying has a certain attribute for security, the information-retrieval support utility 300 does not extract keywords from the Web page, not presenting a keyword list pertaining to the Web page. If the URL is a Web page starting with, for example, "https://", this Web page can contain personal data transmitted and received by high-security communication achieved through authentication or encryption. Such a Web page is not subjected to the keyword extraction and the keyword list presentation.

The information-retrieval support utility 300 neither extracts keywords from the Web page being displayed by the browser 100 nor presents a list of keywords pertaining to the Web page if this Web page has been acquired from a file server, not from an HTML server. From which server the Web page has been acquired can be determined in accordance with whether the URL starts with "fts://".

Moreover, the browser 100 can display not only an HTML file acquired through a network such as the Internet, but also any HTML file stored in, for example, the HDD of the computer 10. This is why the information-retrieval support utility 300 neither extracts keywords nor presents a keyword list if the browser 100 displays any HTML file stored in the computer 10.

As described above, the information-retrieval support utility 300 acquires the environment-setting XML 202 from the recommended content providing server 11, and sets an environment for the gadget application 200 to display data, in accordance with the data contained in the environment-setting XML 202. The URL, for which keywords need not be extracted or a keyword list need not be represented, can therefore be notified from the recommended content providing server 11 to the information-retrieval support utility 300 of the computer 10. Further, an interface through which the user may input the URL, for which neither keywords need be extracted nor a keyword list need be represented, may be provided in the gadget application 200 or the information-retrieval support utility 300.

The environment-setting XML 202 can be used to designate, in the recommended content providing server 11, the attribute (classification) data of the keyword that should be selected first in order to present the keyword extracted from the Web page in the keyword list.

The basic flow of the spot content display process performed in the computer 10 will be explained below, with reference to FIG. 4.

Assume that both the gadget application 200 and the information-retrieval support utility 300 are incorporated as resident programs in the computer 10. Then, when the computer 10 is activated ("b1" in FIG. 4), the window of the gadget application 200 is displayed. By contrast, the browser 100 is activated, as needed, by the user, because the browser 100 is not incorporated as a resident program in the computer. When activated, the information-retrieval support utility 300 first causes the gadget application 200 to display the rotation content ("b2" in FIG. 4).

Figure 4:
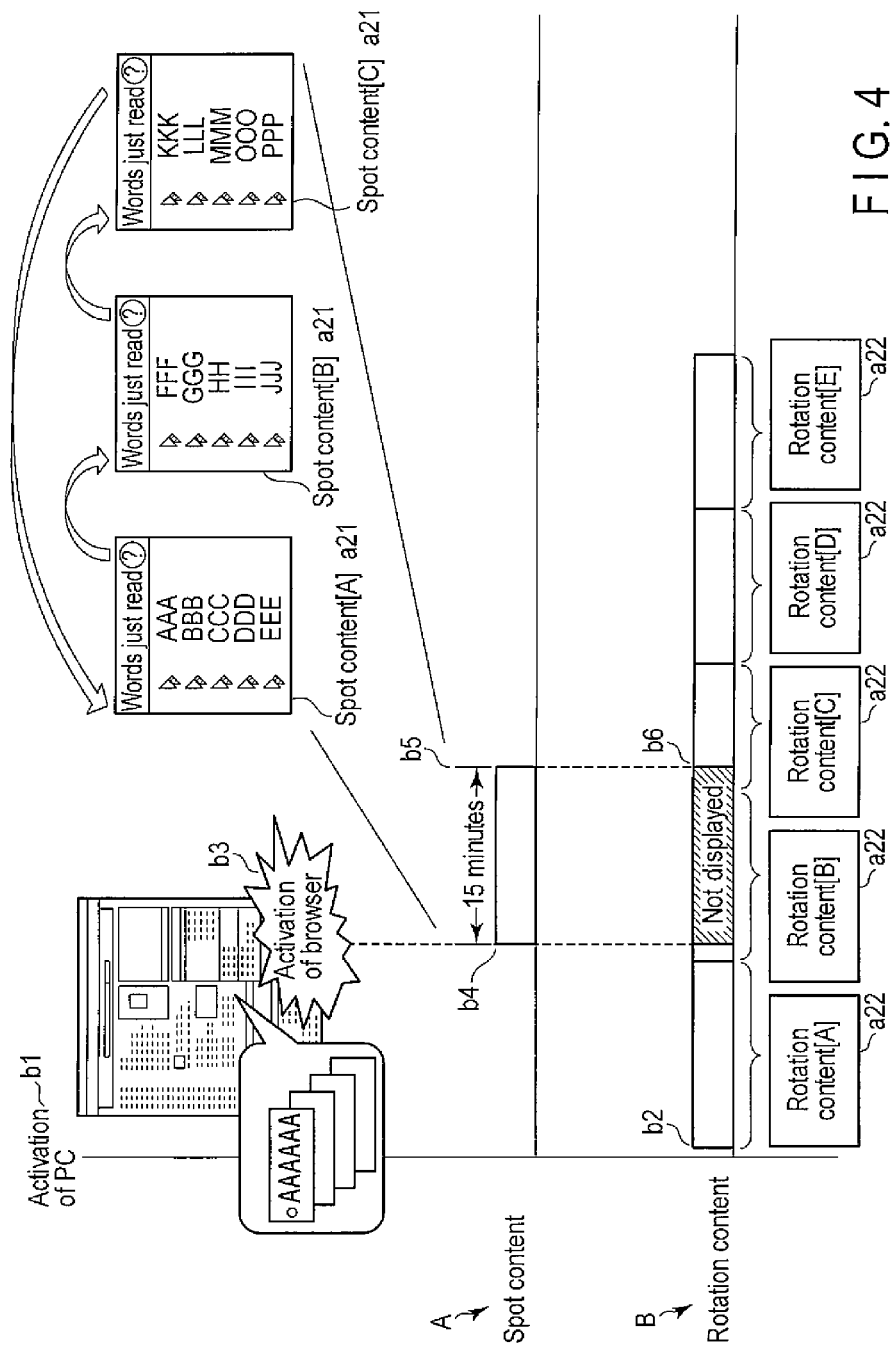
FIG. 4 is an exemplary diagram showing a basic flow of a spot content display process performed in the information processing apparatus according to the embodiment.

Now that the browser 100 has been activated, the user starts reviewing the Web page ("b3" in FIG. 4). At this point, the information-retrieval support utility 300 starts displaying spot content ("b4" in FIG. 4). The gadget application 200 displays rotation content, as an image superimposed on the rotation content. That is, the transition of the rotation content continues on the screen (though not displayed) while the spot content is being displayed.

The spot content HTML file 357 generated by the information-retrieval support utility 300 is configured to present the keywords extracted from the Web page the user is reviewing, to the user in the priority order over three pages. The spot content is periodically switched, whereby more information can be presented to the user than otherwise, in the limited display area. Further, the keyword list extracted from the Web pages the user has reviewed within a predetermined period may be added to the fourth page.

Every time the browser 100 displays a new Web page, the information-retrieval support utility 300 updates the spot content (more precisely, spot content HTML file 357). The user can therefore see the latest keyword list extracted from the Web page now displayed. If the user finds an interesting keyword in the latest keyword list, he or she selects this keyword in the window of the gadget application window 200. Then, the user can retrieve the information he or she wants, even if he or she cannot track a Web page related to the keyword from the Web page the browser 100 is displaying (because the URL of the Web page related to the keyword is not embedded in the Web page being displayed).

The information-retrieval support utility 300 displays the spot content, only for the period designated by the recommended content providing server 11, that is, for the period represented by the data contained in the environment-setting XML 202. Assume that the period thus predetermined is 15 minutes. Then, after 15 minutes has elapsed from the start of spot content display, the information-retrieval support utility 300 stops displaying the spot content ("b5" in FIG. 4). As a result, the rotation content is displayed again in the window of the gadget application 200 ("b6" in FIG. 4).

In most cases, the time for which the user may keep interested in the keyword list about the Web page he or she is reviewing is limited (that is, the time the user can keep his mind on the keyword list is not long). Therefore, the content is switched from the spot content to the rotation content when the user seems to lose his or her interest in the key word list. This accomplishes the presentation of useful information.

Hitherto explained with reference to FIG. 4 is the basic flow of the spot content display process. Hereinafter, it will be explained how the spot content display process is performed in accordance with the operation of the browser 100.

(Pattern 1)

Figure 5:
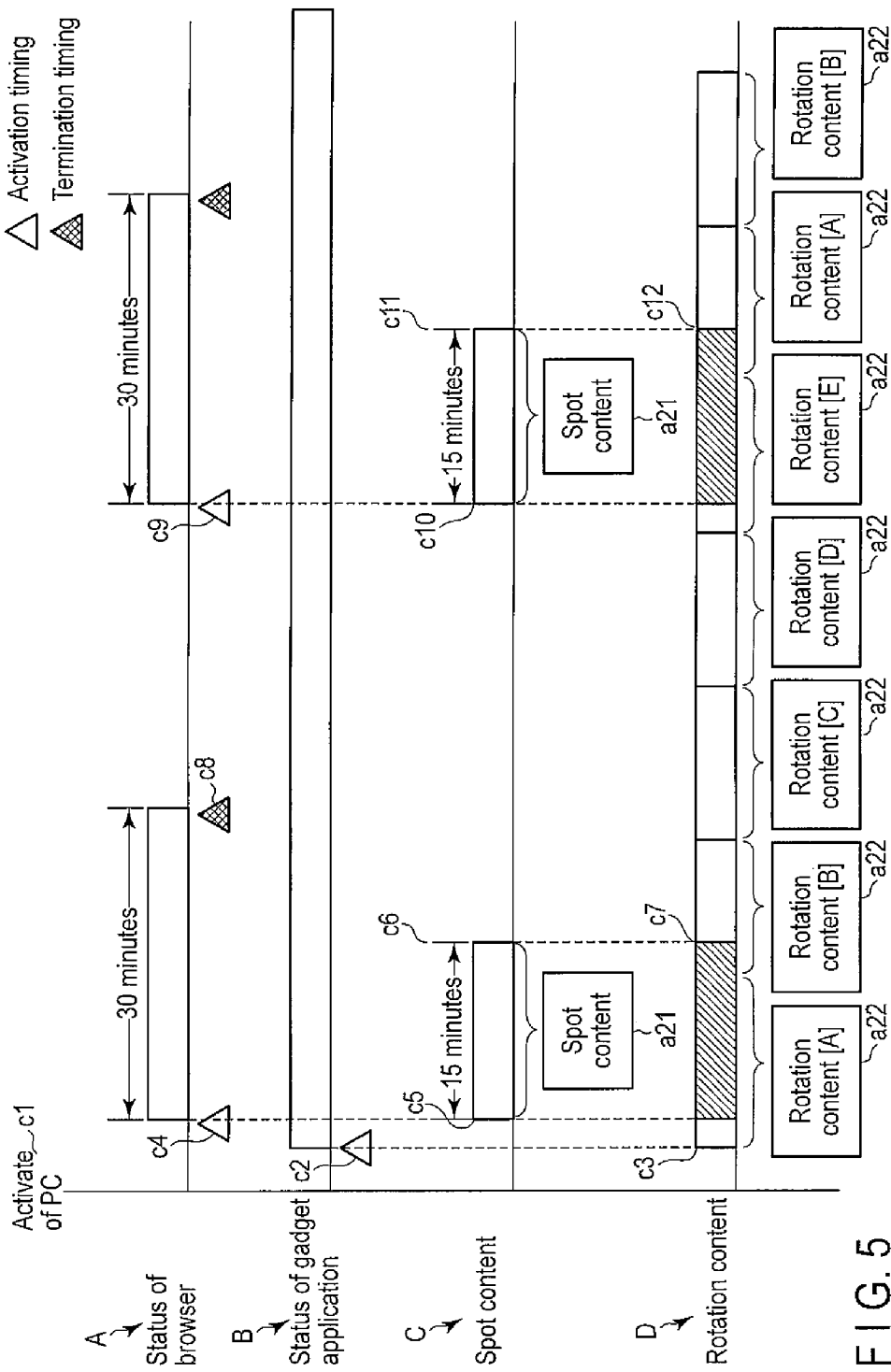
FIG. 5 is an exemplary first diagram (pattern 1) showing a sequence of displaying spot content in accordance with the operation of a browser in the information processing apparatus according to the embodiment.

FIG. 5 is an exemplary diagram explaining a pattern in which spot content is displayed if the browser 100 is repeatedly activated and terminated, operating each time for 15 minutes or more.

As described above, when the computer 10 is activated ("c1" in FIG. 5), the gadget application 200 (i.e., resident program) incorporated in the computer 10 is activated (the information-retrieval support utility 300 is also activated) ("c2" in FIG. 5). As a result, the displaying of rotation content is started ("c3" in FIG. 5).

Thereafter, the browser 100 is activated, and the user may start reviewing a Web page ("c4" in FIG. 5). At this point, the displaying of spot content is started ("c5" in FIG. 5). After 15 minutes has elapsed, the displaying of spot content is ended ("c6" in FIG. 5), and the displaying of rotation content is resumed ("c7" in FIG. 5).

Assume that the user keeps reviewing the Web page for 30 minutes (i.e., period form "c4" to "c8," longer than the period of displaying the spot content). Then, when the browser 100 is activated again ("c9" in FIG. 5), the information-retrieval support utility 300 causes the gadget application 200 to display the spot content ("c10" in FIG. 5). At this point, the counting of the display period (15 minutes) of spot content is started. Therefore, after the elapse of 15 minutes, the displaying of spot content displaying is ended ("c11" in FIG. 5), and the displaying of rotation content is resumed as before ("c12" in FIG. 5). As already indicated, the process of displaying the rotation content continues (though the rotation content is not visible to the user), while the spot content is being displayed.

That is, "the displaying of rotation content is resumed" means "the rotation content which was hidden in the spot content appears again on the screen".

(Pattern 2)

Figure 6:
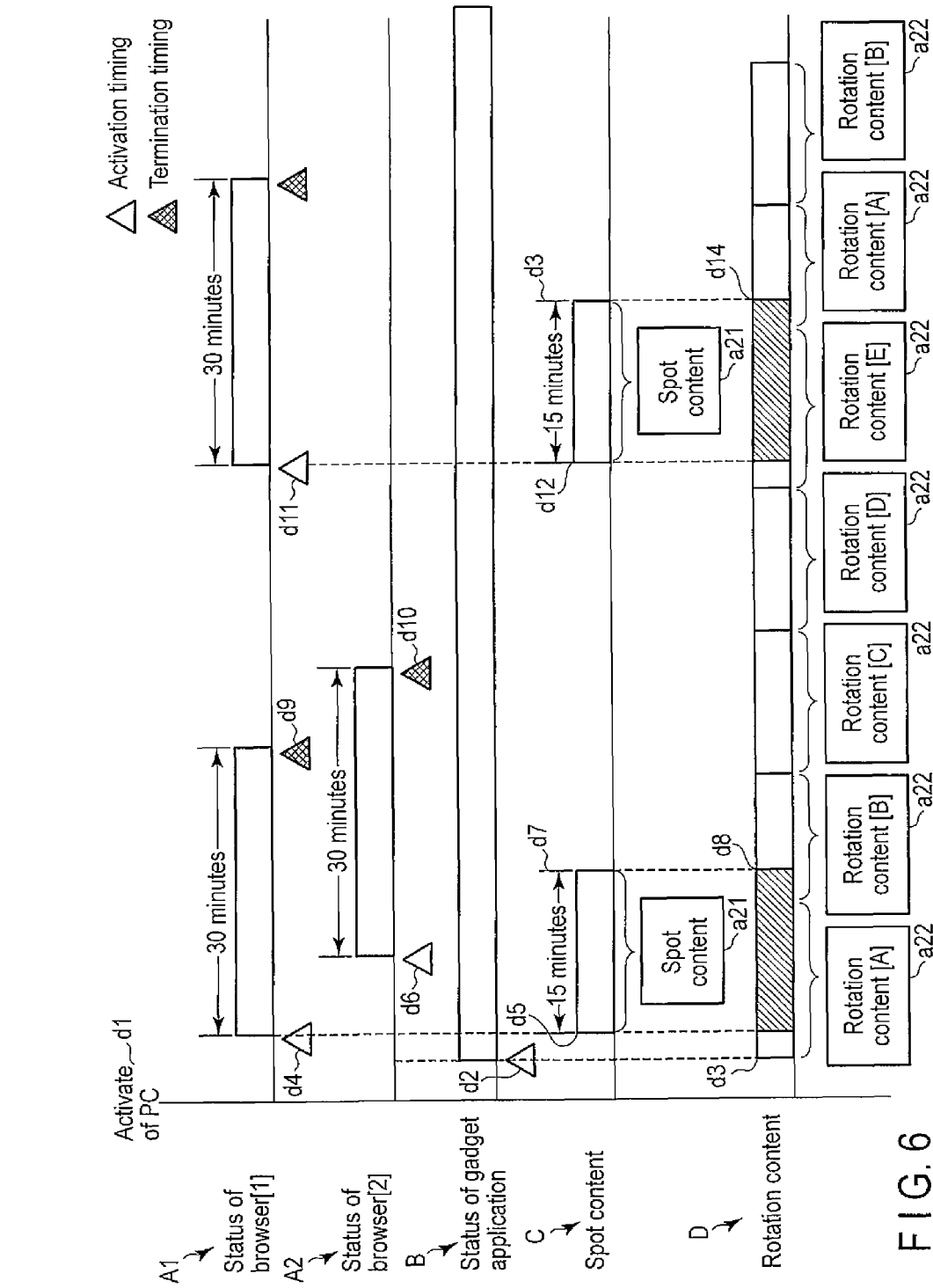
FIG. 6 is an exemplary second diagram (pattern 2) showing the sequence of displaying spot content in accordance with the operation of a browser in the information processing apparatus according to the embodiment.

FIG. 6 is an exemplary diagram explaining a pattern in which spot content is displayed if a browser 100 has already been activated and if another browser 100 is activated.

The multi-window function is the basic function of the OS, enabling the user to use a plurality of applications at the same time. The multi-window function also enables the user to activate a plurality of identical application programs (i.e., browsers 100), whereby the user can review a plurality of Web pages displayed side by side. In other words, a browser can be activated, in addition to another browser 100 already activated.

When the computer 10 is activated ("d1" in FIG. 6), the gadget application 200 (i.e., resident program) incorporated in the computer 10 is activated (the information-retrieval support utility 300 is also activated) ("d2" in FIG. 6). As a result, the displaying of rotation content is started ("d3" in FIG. 6).

Thereafter, the browser 100 is activated, and the user may start reviewing a Web page ("d4" in FIG. 6). At this point, the displaying of spot content is started ("d5" in FIG. 6), and the information-retrieval support utility 300 starts measuring time, until the period (15 minutes) of displaying the spot content expires.

Assume that another browser 100 is activated within 15 minutes from the displaying of spot content ("d6" in FIG. 6). At this point, the information-retrieval support utility 300 does not reset the period (15 minutes) of displaying the spot content, and keeps counting time. After 15 minutes has elapsed from the activation of the first browser 100, the displaying of spot content is ended ("d7" in FIG. 6). Then, the displaying of rotation content is resumed ("d8" in FIG. 6).

Thereafter, the first browser 100 is terminated ("d9" in FIG. 6), and the second browser 100 is then terminated ("d10" in FIG. 6). When the first browser 100 is activated again ("d11" in FIG. 6), the information-retrieval support utility 300 causes the gadget application 200 to display the spot content ("d12" in FIG. 6). At this point, the information-retrieval support utility 300 starts measuring time, until the period (15 minutes) of displaying the spot content expires. After 15 minutes has elapsed, the displaying of spot content is ended ("d13" in FIG. 6). Then, the displaying of rotation content is resumed ("d14" in FIG. 6).

Even if the second browser 100 is activated while the first browser 100 is still activated, the period (15 minutes) of displaying the spot content is not reset. This prevents the period of displaying the spot content from being unnecessarily extended.

(Pattern 3)

Figure 7:
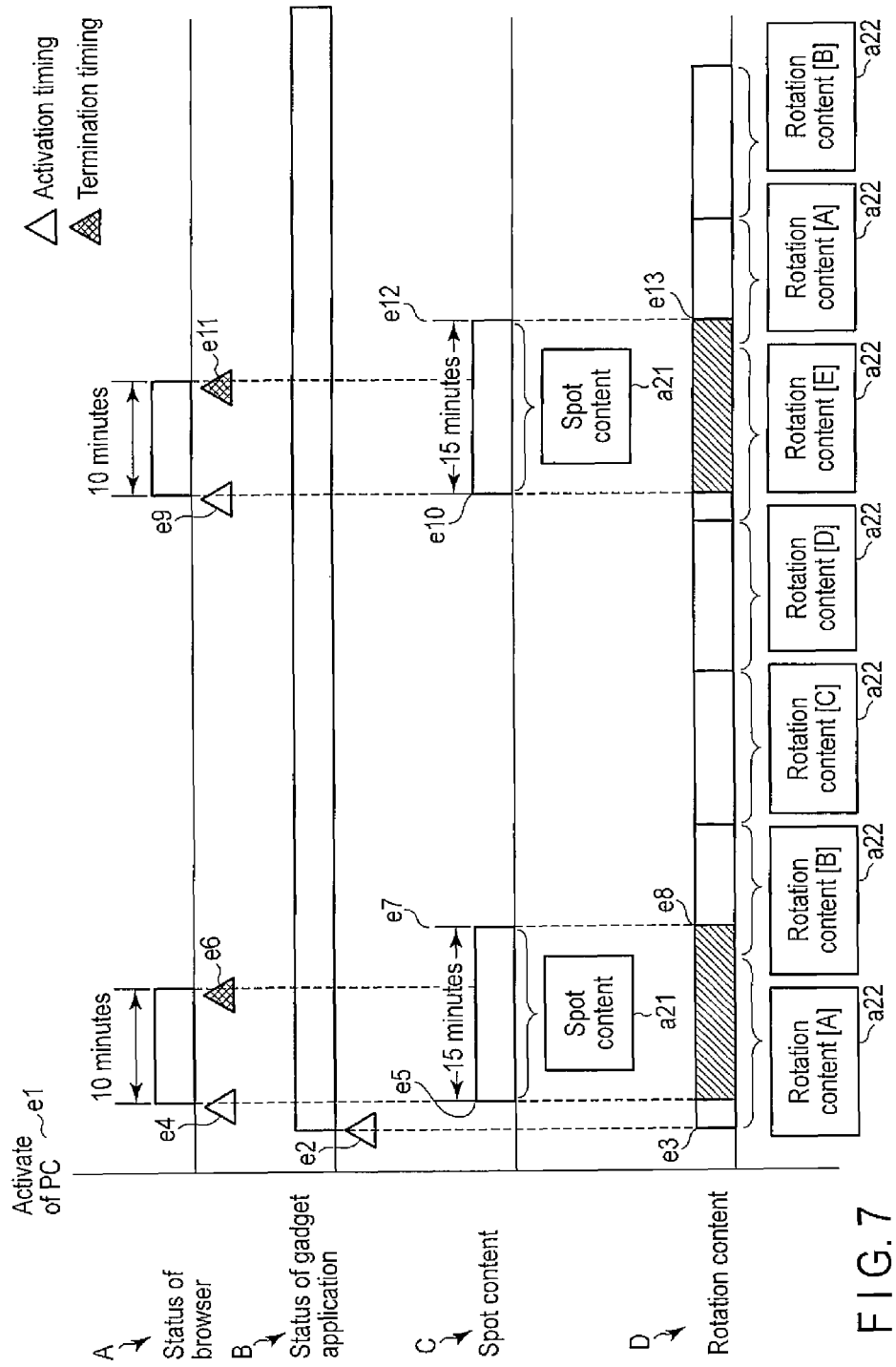
FIG. 7 is an exemplary third diagram (pattern 3) showing the sequence of displaying spot content in accordance with the operation of a browser in the information processing apparatus according to the embodiment.

FIG. 7 is an exemplary diagram explaining a pattern in which spot content is displayed if the browser 100 is repeatedly activated and terminated, operating each time for less than 15 minutes.

When the computer 10 is activated ("e1" in FIG. 7), the gadget application 200 (i.e., resident program) incorporated in the computer 10 is activated (the information-retrieval support utility 300 is also activated) ("e2" in FIG. 7). As a result, the displaying of rotation content starts ("e3" in FIG. 7).

Thereafter, the browser 100 is activated, and the user may start reviewing a Web page ("e4" in FIG. 7). At this point, the displaying of spot content is started ("e5" in FIG. 7). At the same time, the information-retrieval support utility 300 starts measuring time until the period (15 minutes) of displaying the spot content expires.

Assume that the browser 100 is terminated before the period of 15 minutes expires ("e6" in FIG. 7). In this case, too, the information-retrieval support utility 300 keeps measuring time until the period of 15 minutes expires. When the period of 15 minutes expires, the information-retrieval support utility 300 terminates the displaying of spot content ("e7" in FIG. 7), and resumes the displaying of rotation content ("e8" in FIG. 7).

The termination the browser 100 and the termination of the displaying of spot content are not synchronized, rendering it unnecessary to detect an abnormal termination of, for example, the browser 100. This simplifies the procedure of terminating the displaying of spot content, after 15 minutes has elapsed from the time the user started reviewing the Web page after the first activation of the browser 100.

Thereafter, the browser 100 is activated again ("e9" in FIG. 7), and the information-retrieval support utility 300 causes the gadget application 200 to display the spot content ("e10" in FIG. 7). At this point, the counting of the display period (15 minutes) of spot content is started. Even if the browser 100 is terminated before the elapse of the 15-minute period ("e11" in FIG. 7), the information-retrieval support utility 300 keeps displaying the spot content as before. After 15 minutes has elapsed, the information-retrieval support utility 300 terminates the displaying of spot content ("e12" of FIG. 7). The displaying of rotation content is thereby resumed ("e13" in FIG. 7).

(Pattern 4)

Figure 8:
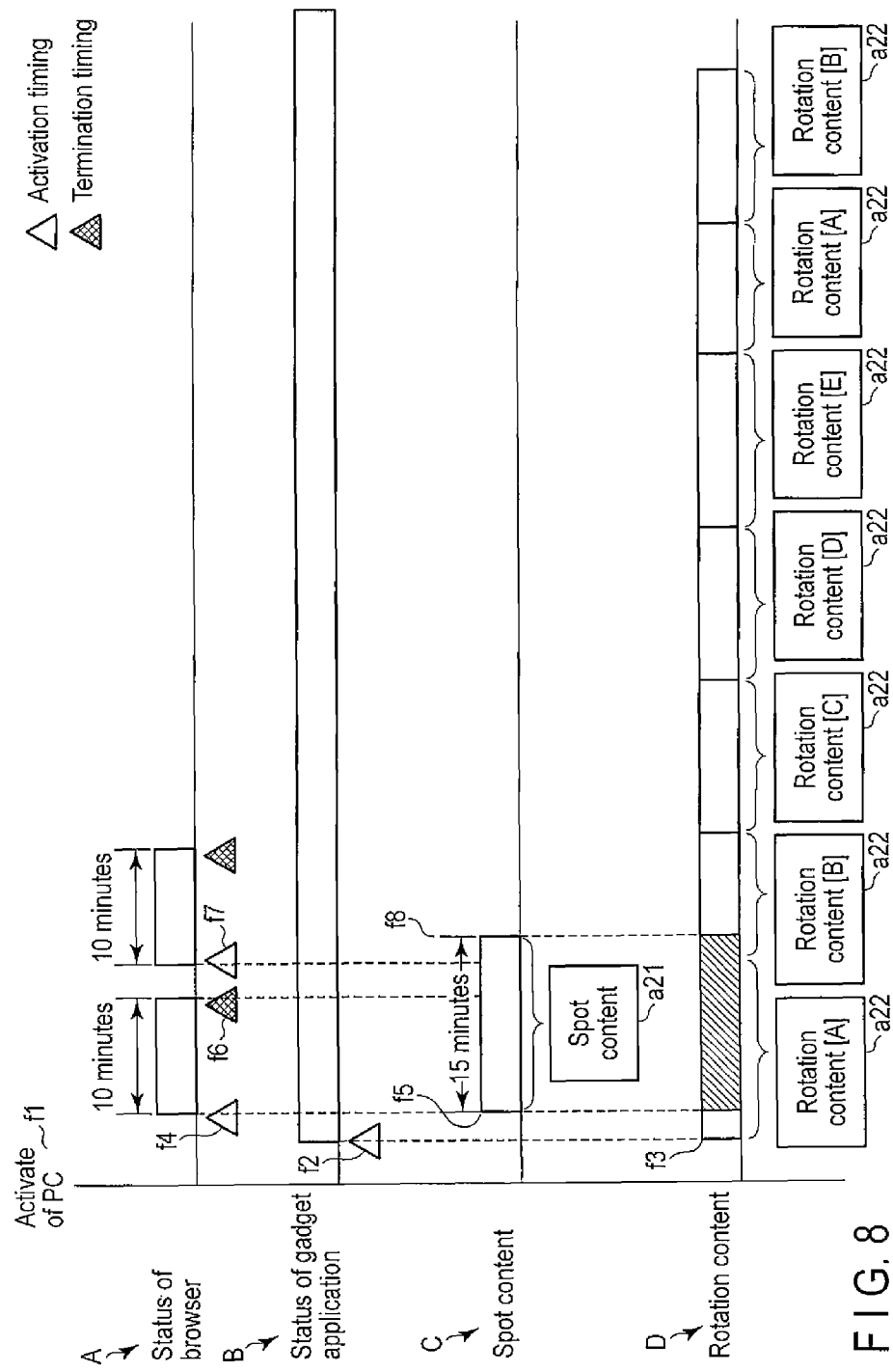
FIG. 8 is an exemplary fourth diagram (pattern 4) showing the sequence of displaying spot content in accordance with the operation of a browser in the information processing apparatus according to the embodiment.

FIG. 8 is an exemplary diagram explaining a pattern in which spot content is displayed if the browser 100 is terminated within 15 minutes after being activated and is activated again.

In Pattern 2 described above, the period of displaying the spot content is not reset even if the second browser 100 is activated while the spot content is being displayed after the first browser 100 has been activated. In Pattern 3 described above, the spot content is kept displayed for 15 minutes even if the browser 100 is terminated in the 15-minute period while the spot content is being displayed after the browser 100 has been activated. This pattern, i.e., Pattern 4, is based on the assumption that the browser 100 is activated again while the spot content is being displayed after the browser 100 has been activated for the first time, or if the browser 100 is terminated within 15 minutes and the spot content is yet continuously displayed (for 15 minutes or less).

When the computer 10 is activated ("f1" in FIG. 8), the gadget application 200 (i.e., resident program) incorporated in the computer 10 is activated (the information-retrieval support utility 300 is also activated) ("f2" in FIG. 8). As a result, the displaying of rotation content starts ("f3" in FIG. 8).

Thereafter, the browser 100 is activated, and the user may start reviewing a Web page ("f4" in FIG. 8). At this point, the displaying of spot content is started ("f5" in FIG. 8). At the same time, the information-retrieval support utility 300 starts measuring time until the period (15 minutes) of displaying the spot content expires.

Assume that the browser 100 is terminated before the period of 15 minutes expires ("f6" in FIG. 8). In this case, too, the displaying of spot content continues as described above. Also assume that the browser 100 is activated again while the spot content is being displayed ("f7" in FIG. 8). At this point, the information-retrieval support utility 300 does not reset the period (15 minutes) of displaying the spot content, and keeps counting time. Therefore, even if the browser 100 is repeatedly activated and terminated several times within the 15-minute period, the displaying of spot content is terminated ("f8" in FIG. 8) upon the elapse of 15 minutes from the time the user started viewing the Web page by using the browser 100 for the first time, before the 15-minute period expires from the time the user started viewing the Web page by using the browser 100 for the last time.

If the browser 100 is activated again within a short time, this implies that the user seems has started to lose interest in the keyword list, unlike in the case where the browser 100 is repeatedly activated again at certain intervals. Therefore, the content is switched from the spot content to the rotation content when the user seems to lose his or her interest in the key word list. This achieves the presentation of useful information.

(Pattern 5)

Figure 9:
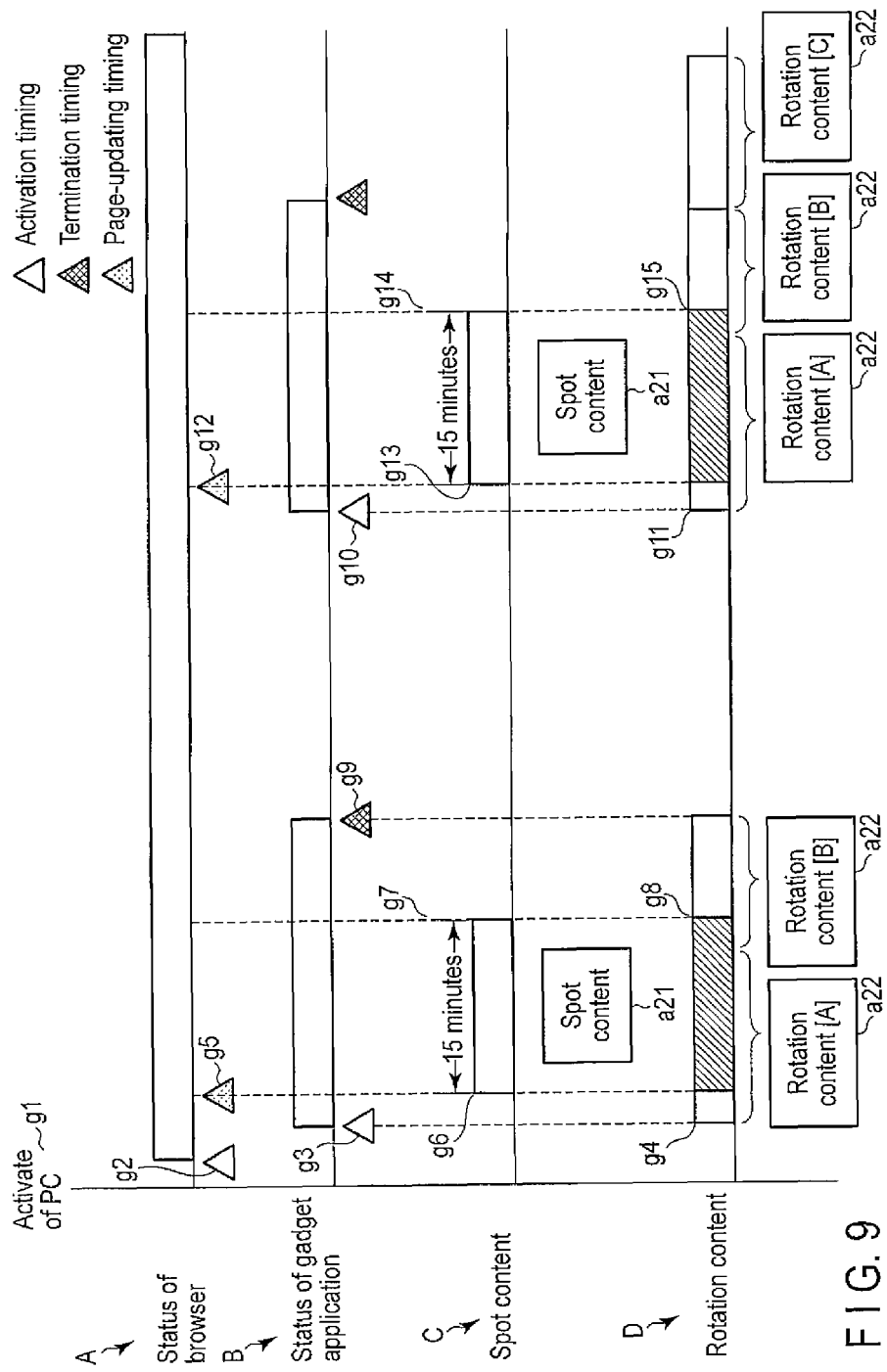
FIG. 9 is an exemplary fifth diagram (pattern 5) showing the sequence of displaying spot content in accordance with the operation of a browser in the information processing apparatus according to the embodiment.

FIG. 9 is an exemplary diagram explaining a pattern in which spot content is displayed if the browser 100 is activated before the gadget application 200 (and information-retrieval support utility 300).

Patterns 1 to 4 described above are based on the assumption that the computer 10 incorporates the gadget application 200 and information-retrieval support utility 300 as resident programs. That is, the browser 100 is activated while the gadget application 200 and information-retrieval support utility 300 are operating.

By contrast, Pattern 5 is based on the assumption that the computer 10 incorporates neither the gadget application 200 nor information-retrieval support utility 300 as a resident program, or that the user first terminates the gadget application 200 and information-retrieval support utility 300, and then activates the browser first and actives the gadget application 200 and information-retrieval support utility 300 while the browser 100 is operating. The information-retrieval support utility 300 may be activated and terminated in synchronism with the gadget application 200. That is, if the information-retrieval support utility 300 is activated when the gadget application 200 is activated, it is terminated when the gadget application 200 is terminated. Then, the user need not recognize the existence or operating state of the information-retrieval support utility 300.

After the computer 10 is activated ("g1" in FIG. 9), the browser 100 is activated first ("g2" in FIG. 9). In this case, the gadget application 200 does not present various data items. If the gadget application 200 and the information-retrieval support utility 300 are activated in this state ("g3" in FIG. 9), the information-retrieval support utility 300 first causes the gadget application 200 to display the rotation content ("g4" in FIG. 9).

Thereafter, the browser 100 activated first updates the Web page ("g5" in FIG. 9). The information-retrieval support utility 300 causes the gadget application 200 to display the spot content ("g6" in FIG. 9). At this point, the information-retrieval support utility 300 starts measuring time until the period (15 minutes) of displaying the spot content expires. After 15 minutes has elapsed, the displaying of spot content is terminated ("g7" in FIG. 9), and the displaying of rotation content is started ("g8" in FIG. 9).

Assume that the user terminates the gadget application 200 (and information-retrieval support utility 300) while the browser 100 is operating ("g9" in FIG. 9) and activates again the gadget application 200 (and information-retrieval support utility 300) while the browser 100 is operating ("g10" in FIG. 9). Then, the information-retrieval support utility 300 first causes the gadget application 200 to display the rotation content ("g11" in FIG. 9), and to display the spot content ("g12" in FIG. 9) when the browser 100 updates the Web page ("g13" in FIG. 9). Upon the elapse of 15 minutes after the start of displaying the spot content, the information-retrieval support utility 300 terminates the displaying of spot content ("g14" in FIG. 9), and switches the content from the spot content to the rotation content ("g15" in FIG. 9).

The displaying of spot content is thus started when the browser 100 acquires the Web page. The information-retrieval support utility 300 need not recognize the operating state of the browser 100 it has activated. To be more specific, the gadget application 200 only needs to be controlled to start displaying the rotation content when the browser 100 activated, and to start displaying the spot content when the browser 100 acquires a new Web page. This simplifies the procedure of terminating the displaying of spot content.

(Pattern 6)

FIG. 10 is an exemplary diagram explaining a pattern in which spot content is displayed when computer 10 is set to a sleep state while the gadget application 200 is displaying the spot content.

The OS includes various power-saving functions. For example, it can set the computer 10 to a power-off state, while supplying power to, for example, the main memory of the computer 10. This power-saving function enables the user to resume the work interrupted at the previous power-off procedure, when he or she turns on the power switch again. The power-off state set by this function is called, for example, "sleep state."

Assume that the computer 10 is set to the sleep mode while the gadget application 200 is displaying the spot content.

When the computer 10 is activated ("h1" in FIG. 10), the gadget application 200 and information-retrieval support utility 300, incorporated as resident programs in the computer 10, are activated ("h2" in FIG. 10). As a result, the displaying of rotation content starts ("h3" in FIG. 10).

Thereafter, the browser 100 is activated, and the user may start reviewing a Web page ("h4" in FIG. 10). At this point, the displaying of spot content is started ("h5" in FIG. 10). At the same time, the information-retrieval support utility 300 starts measuring time until the period (15 minutes) of displaying the spot content expires.

Assume that the computer 10 is set to the sleep state before the period of 15 minutes expires ("h6" in FIG. 10). Then, the information-retrieval support utility 300 detects the transition to the sleep state because it has requested that the OS should notify the transition to and from the sleep state. On detecting the transition to the sleep state, the information-retrieval support utility 300 saves the data representing the time it has measured so far.

Thereafter, the computer 10 comes out of the sleep state ("h7" in FIG. 10). Detecting this transition to the sleep state, the information-retrieval support utility 300 starts measuring again the time of displaying the spot content, in addition to the time data saved. Therefore, the spot content is displayed for 10 minutes after the computer 10 has come out of the sleep state, if the spot content had been displayed for 5 minutes before the transition to the sleep state ("h8" in FIG. 10). The displaying of rotation content is thereby resumed ("h9" in FIG. 10).

The information-retrieval support utility 300 can thus operate well when the computer 10 transits to or from the sleep state while the spot content is being displayed.

Assume that when the computer 10 transits from the sleep state, the remaining period of displaying the spot content is shorter than a predetermined value. Then, the spot content may be kept displayed longer than the remaining period (totally for, e.g., the predetermined displaying period). Thus, even if the remaining period is a few seconds, the spot content can be displayed for a sufficiently long time even if the remaining period displaying the spot content is shorter than the predetermined value. This scheme can be achieved also by subtracting some value from the measured time if the remaining period is shorter than a predetermined value when the computer 10 transits to the sleep state, or by adding some value to the measured time if the remaining period is shorter than a predetermined value when the computer 10 transits from the sleep state.

This scheme can be applied, not only to the case where the computer 10 transits to or from the sleep sate, but to the case where the computer 10 transits to a so-called "hibernation state," in which the contents of the main memory are saved in, for example, the HDD, and the computer 10 is set to a power-off state.

(Pattern 7)

Figure 11:
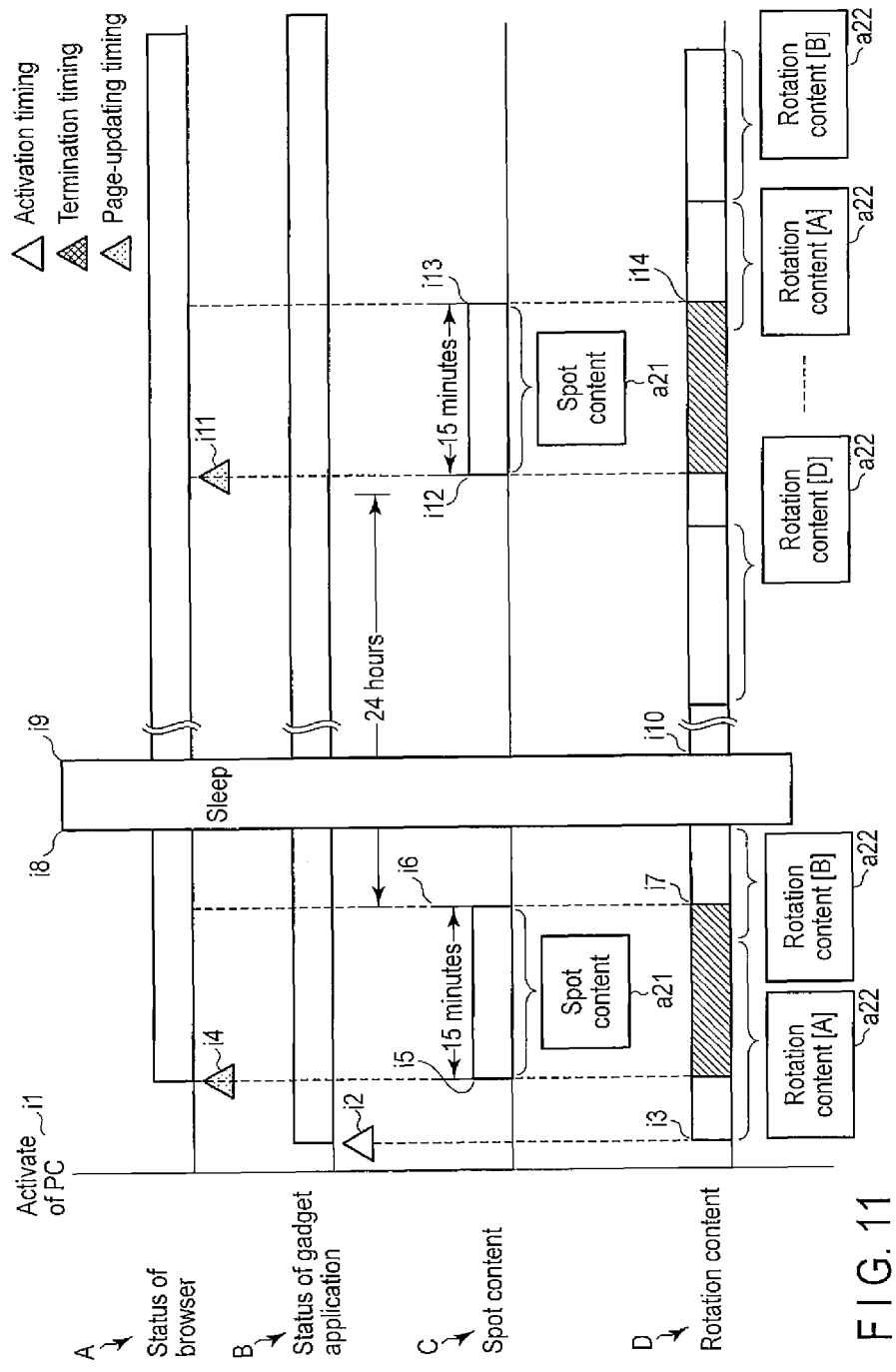
FIG. 11 is an exemplary seventh diagram (pattern 7) showing the sequence of displaying spot content in accordance with the operation of a browser in the information processing apparatus according to the embodiment.

FIG. 11 is an exemplary diagram explaining a pattern in which spot content is displayed when both the browser 100 and the gadget application 200 are operating.

In Pattern 1 described above, when the browser 100 starts displaying the Web page, the spot content is displayed for 15 minutes thereafter. In Pattern 6 described above, the computer 10 may transit from the sleep state back to the normal state.

If the user transits the computer 10 to the sleep state while both the browser 100 and the gadget application 200 are operating, thereby to stop using the computer 10, the gadget application 200 will display the spot content only once.

In Pattern 7, the gadget application 200 can display the spot content even if the user so transits the computer 10 to the sleep state, as will be explained below.

When the computer 10 is activated ("i1" in FIG. 11), the gadget application 200 and information-retrieval support utility 300, both incorporated as resident programs in the computer 10, are activated ("i2" in FIG. 11). As a result, the displaying of rotation content starts ("i3" in FIG. 11).

Thereafter, the browser 100 is activated, and the user may start reviewing a Web page ("i4" in FIG. 11). At this point, the displaying of spot content is started ("i5" in FIG. 11). At the same time, the information-retrieval support utility 300 starts measuring time until the period (15 minutes) of displaying the spot content expires. Upon the elapse of 15 minutes after the start of displaying the spot content, the information-retrieval support utility 300 terminates the displaying of spot content ("i6" in FIG. 11). Then, the displaying of rotation content is resumed ("i7" in FIG. 11).

The computer 10 then transits to the sleep state ("i8" in FIG. 11) while both the browser 100 and the gadget application 200 are operating. Eventually, the computer 10 transits from the sleep state ("i9" in FIG. 11). At this point, the displaying of rotation content is resumed ("i10" in FIG. 11).

The information-retrieval support utility 300 holds the system time recorded at the termination of the previous displaying of spot content. If the displaying of spot content has been interrupted for a predetermined period from the system time (e.g., 24 hours), the displaying of spot content is resumed ("i12" in FIG. 11) when the browser 100 acquires a Web page. At this point, the information-retrieval support utility 300 starts measuring time until the period (15 minutes) of displaying the spot content expires. Upon the elapse of 15 minutes, the information-retrieval support utility 300 first terminates the displaying of spot content ("i13" in FIG. 11) and then resumes the displaying of rotation content ("i14" in FIG. 11).

Thus, the displaying of spot content can be appropriately controlled even if both the browser 100 and the gadget application 200 are constantly operating.

As has been described, the displaying of spot content is switched to the displaying of rotation content automatically upon the elapse of the predetermined period (e.g., 15 minutes) from the time the displaying of the spot content started, with said period being represented by the data contained in the environment-setting XML 202 acquired from the recommended content providing server 11. Alternatively, a user interface may be provided in the gadget application 200, and the displaying of spot content may be switched to the displaying of rotation content in accordance with the user's instruction input at the user interface.

FIG. 12 is an exemplary diagram showing a menu the gadget application 200 may display in the window a2 shown in FIG. 3.

In FIG. 12, "A" is an exemplary menu the gadget application 200 may display while displaying the spot content a21. Objects j1 are arranged, for example, above the spot content displaying area. When the user touches one of the objects j1, the displaying of spot content is switched to the displaying of rotation content (thus, terminating the displaying of spot content). In FIG. 12, "B" is an exemplary menu the gadget application 200 may display while displaying the rotation content a22. After the displaying of spot content has been automatically terminated, the user may touch one of the objects displayed in the menu B. In this case, the displaying of spot content is resumed.

The OS notifies the touching of the object to the gadget application 200. So notified, the gadget application 200 informs the information-retrieval support utility 300 of the touching. So informed, the information-retrieval support utility 300 generates a spot content HTML file 357, as needed, and instructs the gadget application 200 to switch the spot content (i.e., spot content HTML file 357) to the rotation content (i.e., rotation content HTML file 356), or vice versa.

The objects shown in FIG. 12 may be utilized in order to switch one page to another of a keyword list presented to the user, over several pages as spot content. Assume that three keyword lists are presented as spot content to the user, which are, for example, (1) the latest keyword list extracted from the Web page the browser 100 is displaying, (2) the keyword list extracted from the Web pages the user has periodically reviewed, and (3) the keyword list that many unidentified users have used for a specific period. Then, the three keyword lists are periodically presented to the user, one after another (automatically at preset intervals). Alternatively, the user may switch one of the three keyword lists to any other.

Further, while the keyword list extracted from the Web pages the user has reviewed is being displayed, one of the objects shown in FIG. 12 may be touched. In this case, the keyword list that many unidentified users have used for the specific period (i.e., keyword list acquired from the recommended content providing server 11) may be first displayed.

Moreover, the user interface provided in the gadget application 200 may be utilized to erase the keywords the information-retrieval support utility 300 has accumulated in the extracted keyword DB 355 (or to initialize the extracted keyword DB 355).

FIG. 13 is an exemplary flowchart showing the sequence of displaying spot content, which the computer 10 performs.

When activated, the information-retrieval support utility 300 first causes the gadget application 200 to display the rotation content (Block A1). If the browser 100 is activated thereafter (YES in Block A2), the information-retrieval support utility 300 extracts keywords from the Web page the browser 100 is displaying (Block A3). The information-retrieval support utility 300 then generates spot content (Block A4).

The information-retrieval support utility 300 causes the gadget application 200 to display the spot content, overlapped on the rotation content (Block A5). Then, the information-retrieval support utility 300 determines whether a predetermined time has elapsed from the start of displaying the spot content (Block A6), and also determines whether the Web page updated by the browser 100 has been updated or not (Block A7). If the Web page updated by the browser 100 has been updated (YES in Block A7), the information-retrieval support utility 300 extracts keywords from the Web page updated, generating spot content, and causes the gadget application 200 to display the spot content thus generated (Blocks A3, A4 and A5).

Upon the elapse of the predetermined time from the start of displaying the spot content (YES in Block A6), the information-retrieval support utility 300 causes the gadget application 200 to stop displaying the spot content (Block A8), and to display the rotation content again.

As has been described, the computer 10 presents, as needed, recommended keywords to the user reviewing a Web page.

This embodiment performs controls in accordance with software (i.e., programs). If the software is installed in an ordinary computer via a computer-readable storage medium storing the software, the same advantage as achieved in the embodiment will be easily attained.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of processing data for an information processing apparatus, the method comprising:
    displaying keywords extracted from a Web page a browser is displaying;
    transmitting a keyword and attribute data associated with the keyword to a retrieval site if the keyword is selected from the displayed keywords;
    updating the displayed keywords if a Web page displayed by the browser is changed; and
    continuing displaying of keywords extracted from a Web page displayed before the browser is terminated even if the browser is terminated, and terminating the displaying of keywords upon an elapse of a first period from starting the displaying of keywords.

2. The method of claim 1, further comprising resuming the displaying of the keywords if the browser is activated again after the displaying of the keywords is terminated upon the elapse of the first period.

3. The method of claim 1, further comprising remeasuring a time elapsed from an additional activation of the browser if a browser is additionally activated while the browser is operating.

4. The method of claim 1, further comprising continuing to measure a time elapsed if the browser is terminated before the elapse of the first period and if the browser is activated again before the elapse of the first period.

5. The method of claim 1, further comprising:
detecting that the apparatus transitions to a sleep state or a hibernation state, and saving a measured time elapsed from starting the displaying of keywords; and
resuming measuring a time from the measured time if the apparatus transitions back from the sleep state or the hibernation state.

6. The method of claim 5, further comprising continuously displaying the keywords for a time longer than a remaining part of the first period after the apparatus transitions back from the sleep state or the hibernation state, if the remaining part of the first period is shorter than a first value at the time the apparatus transitions to the sleep state or the hibernation state.

7. The method of claim 1, further comprising displaying the keywords again if the browser acquires the Web page where the displaying of the keywords is interrupted longer than a first time after the displaying of the keywords is terminated upon the elapse of the first period.

8. The method of claim 1, further comprising terminating the displaying of the keywords if a first operation is performed at the apparatus before the first period expires.

9. The method of claim 1, further comprising preventing the extracting of the keywords from the Web page and the displaying of the extracted keywords if the Web page acquired by the browser has a first attribute for security.

10. The method of claim 1, further comprising preventing the extracting of the keywords from the Web page and the displaying of the extracted keywords if the Web page acquired by the browser is a Web page stored in a storage medium in the apparatus.

11. The method of claim 1, further comprising preventing the extracting of the keywords from the Web page and the displaying of the extracted keywords if a uniform resource locator (URL) of the Web page acquired by the browser comprises first information.

12. The method of claim 1, further comprising preventing the extracting of the keywords from the Web page and the displaying of the extracted keywords if the Web page acquired by the browser is a Web page acquired by a designated uniform resource locator (URL).

13. The method of claim 1, further comprising:
accumulating the extracted keywords;
counting and displaying the accumulated keywords; and
transmitting a keyword and attribute data associated with the keyword to the retrieval site if the keyword is selected from the displayed keywords.

14. The method of claim 13, further comprising:
storing classification data associated with the selected keyword in association with the selected keyword; and
displaying keywords associated with a designated classification prior to other keywords.

15. The method of claim 13, further comprising:
displaying keywords acquired from a designated Web site; and
transmitting a keyword and attribute data associated with the keyword to the retrieval site if the keyword is selected from the displayed keywords.

16. The method of claim 15, further comprising switching between the displaying of the accumulated keywords and the displaying of the keywords acquired from the designated Web page, at first intervals or at the time a first operation is performed at the apparatus.

17. The method of claim 14, further comprising erasing of the accumulated keywords and the classification data associated with the accumulated keywords if a first operation is performed at the apparatus.

18. A method of processing data for an information processing apparatus, the method comprising:
displaying keywords extracted from a Web page a browser is displaying;
transmitting a keyword to a retrieval site if the keyword is selected from the displayed keywords;
updating the displayed keywords if the Web page displayed by the browser is changed; and
continuing displaying of keywords extracted from a Web page displayed before the browser is terminated even if the browser is terminated, and terminating the displaying of keywords upon an elapse of a first period from starting the displaying of keywords.

19. An information processing apparatus comprising:
a display configured to display a Web page displayed by a browser and keywords extracted from the Web page;
an operating module configured to select a keyword from the keywords displayed on the display;
a transmitter configured to transmit a selected keyword to a retrieval site; and
a controller configured to update keywords to be displayed on the display if the Web page displayed by the browser is changed,
wherein the controller is further configured to continue displaying of keywords extracted from a Web page displayed before the browser is terminated even if the browser is terminated, and to terminate the displaying of keywords upon an elapse of a first period from starting the displaying of keywords.

20. A computer-readable, non-transitory storage medium having stored thereon a computer program which is executable by a computer, the computer program controlling the computer to function as:
a first module configured to extract keywords from a Web page acquired by a browser;
a second module configured to request a retrieval based on a keyword if the keyword is selected from the extracted keywords;
a third module configured to update the extracted keywords if the Web page displayed by the browser is changed; and
a fourth module configured to continue displaying of keywords extracted from a Web page displayed before the browser is terminated even if the browser is terminated, and to terminate the displaying of keywords upon an elapse of a first period from starting the displaying of keywords.

* * * * *